United States Patent [19]

Kler

[11] 4,356,805
[45] Nov. 2, 1982

[54] FUEL VAPORIZING DEVICE

[76] Inventor: Frank J. Kler, 508 W. Hollywood, Detroit, Mich. 48203

[21] Appl. No.: 171,114

[22] Filed: Jul. 22, 1980

[51] Int. Cl.³ ..................... F02M 31/00; F02M 17/18
[52] U.S. Cl. ................................. 123/557; 123/523; 123/525; 261/DIG. 83
[58] Field of Search ............... 123/557, 522, 523, 572, 123/573, 575, 577, 525; 261/30, DIG. 83, 144, 145

[56] References Cited

U.S. PATENT DOCUMENTS

| | | | |
|---|---|---|---|
| 367,937 | 8/1887 | Shaw | 123/525 |
| 1,603,660 | 10/1926 | Cassella | 123/557 |
| 2,315,881 | 4/1943 | Thomas | 123/525 |
| 2,315,882 | 4/1943 | Trimble | 123/525 |
| 2,742,886 | 4/1956 | McPherson | 123/522 |
| 3,834,365 | 9/1974 | Ussery | 123/573 |
| 4,074,666 | 2/1978 | Pierce | 123/523 |
| 4,106,455 | 8/1978 | Vance | 123/557 |
| 4,137,878 | 2/1979 | Mineck | 123/573 |
| 4,197,820 | 4/1980 | Trudel | 123/523 |
| 4,220,127 | 9/1980 | Reynolds | 123/522 |
| 4,274,383 | 6/1981 | Adams | 261/144 |

FOREIGN PATENT DOCUMENTS

| | | | |
|---|---|---|---|
| 972864 | 5/1941 | France | 123/557 |
| 2042076 | 9/1980 | United Kingdom | 261/144 |

*Primary Examiner*—Ronald H. Lazarus
*Attorney, Agent, or Firm*—Basile, Weintraub & Hanlon

[57] ABSTRACT

A fuel vaporizing device for use with internal combustion engines including a carburetor, an air filter, and a fuel tank. In the device of the present invention fuel consumed by the engine is directed to source such as a fuel tank to a conventional carburetor with the fuel aspirated and mixed with engine air and burned in a conventional manner. Fuel in the second fuel conduit is directed to a fuel vaporizer where the fuel is heated to enhance vaporization. An air pump directs air to the fuel vaporizer where the air collects vapor, and the air and vapor are directed to the carburetor upstream of the carburetor throttle valve where the air and vapor are mixed with the air passing through the carburetor.

7 Claims, 2 Drawing Figures

FUEL VAPORIZING DEVICE

BACKGROUND OF THE INVENTION

I. Field of the Invention

The present invention generally relates to the field of carburetors for internal combustion engines and, in particular the present invention is concerned with carburetors for internal combustion engines including a fuel vaporizing device to vaporize a portion of the fuel consumed by the engine.

II. Description of the Prior Art

In recent years there has been a deep concern by the public for conservation of energy and in particular the conservation of gasoline consumed by automobiles. In addition there has been the requirement mandated by law to reduce exhaust emissions. In a conventional carburetor for gasoline engines fuel is aspirated by the flow of air through the throat of the carburetor and small droplets of gasoline are dispersed in the air and introduced to the engine combustion chamber where they are burned. The fuel droplets are randomly sized and the larger droplets do not completely burn in the combustion process and cause incomplete combustion, a loss of fuel economy, and contribute to pollutants in the engine exhaust. Vapor engines are known wherein the fuel is vaporized by heating before being mixed with incoming air. Vapor engines improve the engine's combustion efficiency, but often result in unstable combustion and a loss of power due to the high temperature of the fuel-air mixture entering the engine combustion chambers. Examples of vaporized fuel systems for internal combustion engines are disclosed in U.S. Pat. Nos.: 4,003,356; 3,817,233; 3,892,211; 3,951,124; 3,653,643; 3,496,919; 2,982,528; 2,064,217; 1,997,497; and 1,980,496. These patents are relevant to the present invention in that they represent the closest prior art for utilizing vaporized fuel in conjunction with an internal combustion engine to maximize the efficiency of the internal combustion engine.

SUMMARY OF THE INVENTION

The present invention, which will be described in greater detail hereinafter, comprises a fuel vaporizing device for use with internal combustion engines inluding a carburetor, an air filter, and a fuel tank. The vaporizer includes a vaporized fuel chamber and a first fuel conduit connected at a first end to a source of fuel and connected at a second end to the carburetor. A second fuel conduit is connected at a first end to the source of fuel and connected at a second end to the vaporizer to supply fuel to the vaporizer. Fuel is maintained at a predetermined fuel level in the vaporizer by a float valve which admits fuel to the vaporizer when the fuel level has dropped and interrupts the flow of fuel to the vaporizer when the desired fuel level has been reached. Fuel is vaporized in the vaporized fuel chamber by a heating means emersed within the fuel wherein warm engine coolant or engine oil is circulated through the heating means to raise the temperature of the fuel within the vaporizer. An electrically driven air pump is provided to circulate air through the vaporized fuel chamber where the air picks up vapor and the air and vapor mixture is then directed to the carburetor where it is introduced into the carburetor air flow ahead of the carburetor throttle valve. The engine receives from the carburetor a mixture of aspirated fuel and vaporized fuel which substantially improves the engine efficiency and performance and reduces engine pollutants eliminating the need for extensive engine pollution control equipment.

It is therefore a primary object of the present invention to provide a new and improved fuel system for internal combustion engines having a carburetor.

It is a further object of the present invention to provide such an improved system which combines vaporized fuel and aspirated fuel with air for burning in the engine combustion chambers.

It is yet another object of the present invention to provide such a fuel system that includes a means for maintaining a predetermined fuel level in the vaporizer.

It is another object of the present invention to provide such a fuel system with an air pump to transmit air through the vaporizer for mixing vaporized fuel and to direct the air and vapor mixture to the carburetor to be mixed with air and atomized fuel for burning in the engine.

It is yet another object of the present invention to provide an improved fuel system for internal combustion engines which provides vaporized fuel and atomized fuel mixed with air for burning in a combustion engine with the vaporizer including a heater to improve the operation of the vaporizer.

Further object, advantages, and applications of the present invention will become apparent to those skilled in the art of internal combustion fuel systems when the accompanying description of one example of the best mode contemplated for practicing the invention is read in conjunction with the accompanying drawing.

BRIEF DESCRIPTION OF THE DRAWING

In the drawing, like reference numbers refer to like parts throughout the several views, and wherein.

DESCRIPTION OF THE PREFERRED EMBODIMENT

Figure 1:
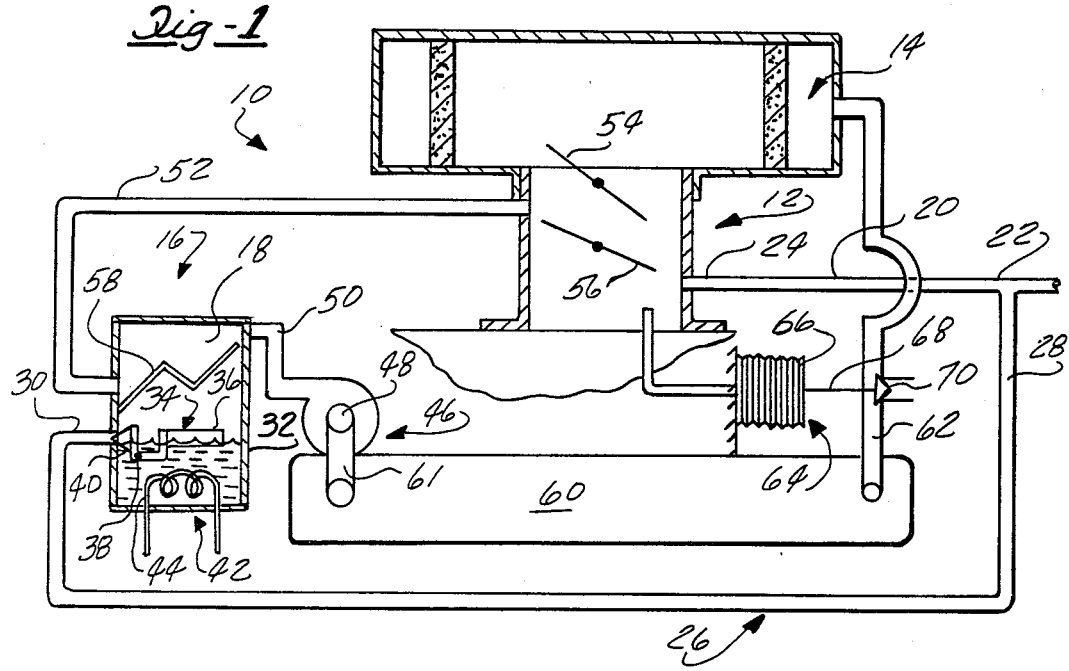
FIG. 1 illustrates the preferred embodiment of the fuel vaporizing device of the present invention.

Referring now to the drawing, there is illustrated in FIG. 1 at 10 a preferred embodiment of the present invention in the form of a fuel vaporizing device. The vaporizing device 10 is adapted for use with internal combustion engines having a carburetor 12, an air filter 14, and a fuel tank or source of fuel (not shown). A vapor 16 includes a vaporize fuel chamber 18. A first fuel conduit 20 includes a first end 22 connected to the source of fuel and a second end 24 connected to the carburetor 12 where fuel passing through the first fuel conduit 20 is atomized and dispersed into air passing through the carburetor 12 in a known manner. A second fuel conduit 26 includes a first end 28 connected to the source of fuel and a second end 30 connected to the vaporizer 16. The fuel passing through the second fuel conduit 26 is vaporized and passed to the carburetor 12 in a manner which will be described subsequently.

The vaporizer 16 comprises an enclosed container 32 and includes a means 34 for maintaining a predetermined fuel level in the vaporizer 16. The means 34 in the preferred embodiment comprises a float 36 pivotally connected to the container 32 by a pivot 38 and a float actuated valve 40 which responds to the fuel level within the container 32 to admit fuel to the vaporizer 16 or restrict the admission of fuel selectively to maintain the desired fuel level. The vaporizer 16 further includes a means 42 for vaporizing the fuel which in the preferred embodiment comprises a coiled tube 44 through which warm engine coolant or hot engine oil is circulated to raise the temperature of the fuel within the vaporizer 16 and increase the rate at which the fuel may be vaporized. It is obvious to the skilled artisan that any warm fluid such as engine coolant, hot engine oil, or engine exhaust could be circulated through the coiled tube 44 to induce a heat transfer to the fuel contained within the vaporizer 16. It is also apparent to the skilled artisan that an electric resistance coil could be immersed in the fluid through which an electrical current flows to induce heating of the fuel within the vaporizer 16. An air pump 46 is provided which includes an air inlet 48 and an air discharge 50 through which pressurized air is connected. The pressurized air is directed to the vapor fuel chamber 18. The air pump 46 passes air through the vapor fuel chamber 18 where the air collects vapor and the air and vapor mixture is then passed from the vapor fuel chamber 18 to the carburetor 12 by means of a vapor conduit 52. Preferably the air and vapor mixture is introduced into the carburetor 12 between a choke butterfly valve 54 and a throttle valve 56. A baffle 58 is disposed above the surface of the liquid fuel within the vapor fuel chamber 18 to form a barrier between the liquid fuel and the vaporized fuel and avoid sweeping large fuel droplets into the vapor conduit 52 to ensure that only fuel vapor is mixed with the air passing through the vapor fuel chamber 18. The engine in the preferred embodiment includes an engine valve cover 60 disposed in communication with the engine crank case, and a breather conduit 62 which extends between the valve cover 60 and the air inlet side of the air filter 14. The air inlet 48 of the air pump 46 is interconnected with the valve cover 60 by an air inlet conduit 61, and the pump 46 is able to draw air from the air filter 14 into the valve cover 60, then through the air pump 46 and into the vapor fuel chamber 18. Drawing air through the valve cover 60 purges the crank case and valve cover 60 of pollutants which are generally combustibles and introduces warm crank case air into the vapor chamber 18 which further enhances the vaporizing process. In a preferred embodiment a manifold vacuum operated valve 64 is placed in the breather conduit 62 and comprises a bellows 66 with manifold pressure therein and a rod 68 extending from the bellows 66 is connected to a valve 70 which selectively opens to admit unfiltered air when the engine is operating. Manifold vacuum is utilized to actuate the bellows 66 and open the valve 70.

Figure 2:
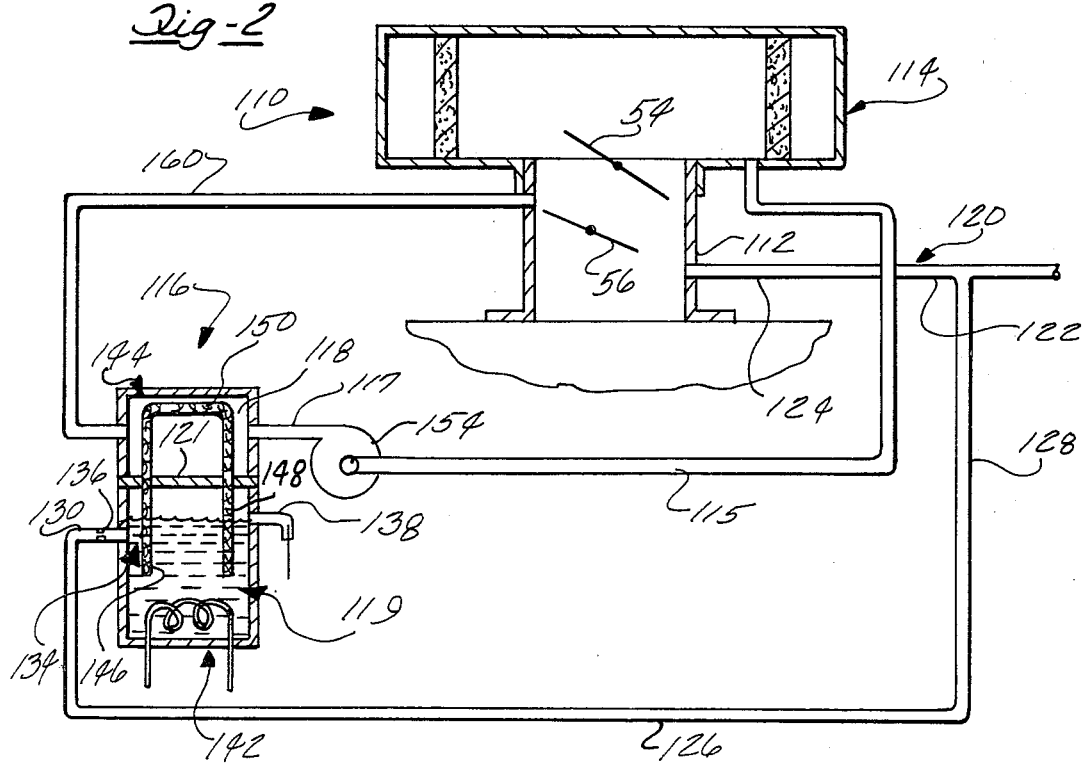
FIG. 2 illustrates an alternate embodiment of the fuel vaporizing device of the present invention.

Referring now to FIG. 2 of the drawing there is illustrated an alternate fuel vaporizing device 110 of the present invention. The alternate fuel vaporizing device 110 includes a carburetor 112, an air cleaner 114, and a vaporizer 116. The vaporizer 116 includes a vaporized fuel chamber 118 and a fuel chamber 119 separated by a wall 121. A first conduit 120 has a first end 122 and a second end 124. Fuel from a source of fuel (not shown) is directed through the conduit 120 from the first end 122 to the second end 124 where the fuel is introduced to the carburetor 112 in which it is atomized and dispersed with the air passing through the carburetor. A second conduit 126 includes a first end 128 and a second end 130. Fuel is conducted through the conduit 126 from the first end 128 to the second end 130 where it is introduced into the fuel chamber 119. A means 134 is provided to control the fuel level within the fuel chamber 119. The means 134 comprises an orifice 136 for restricting the flow of fuel into the fuel chamber 119 and a drain 138 positioned at the desired fuel level to obtain off excess fuel and return it to the vehicle fuel tank (not shown). The vaporizer 116 further includes a means for vaporizing the fuel which comprises a wick 144 having a wick first end 146, a wick second end 148, and a wick central portion 150 that joins the wick first end 146 and the wick second end 148 into a continuous member. The wick first end 146 is immersed in the fuel and extends through an opening formed in the wall 121 into the vapor chamber 118. The wick central portion 150 forms a loop in the vapor chamber and the wick second end 148 extends through an opening in the wall 121 to be immersed in the fuel within the fuel chamber 119. The wick first end 146 and the wick second end 148 draw fuel into the vapor chamber 118 by capillary action and the fuel is vaporized in the vapor chamber 118 by the wick central portion 150. A coiled tube 152 is immersed in the fuel chamber 119 and hot liquid is circulated through the coiled tube 152 to heat the fuel within the fuel chamber 119 further enhancing the rate of vaporization of the fuel from the wick central portion 150. Either hot engine oil, engine exhaust or hot engine coolant may be circulated through the coiled tube 152 to heat the fuel within the chamber 119. It is also obvious to the skilled artisan that an electrical heating element may be immersed within the fuel and electrical current used to perform the heating operation. An air pump 154 is provided which draws filtered air from the filter 114 through a filtered air conduit 115 and conducts pressurized air through a pressurized air conduit 117 into the vaporized fuel chamber 118. Air passing through the vaporized fuel chamber 118 mixes with vapor and the air and vapor mixture is passed to the carburetor 112 by means of a vapor and air conduit 160. The vapor and air mixture is preferably introduced into the carburetor 112 between the choke butterfly 54 and the throttle valve 56.

It can thus be seen that the present invention has provided a new and improved vaporizing device for use with internal combustion engines wherein the high efficiency of a vapor engine is attained along with a non polluting exhaust system with the loss in performance and unstable combustion associated with previous vapor engines avoided.

It should be understood by those skilled in the art of vaporizing devices for internal combustion engines that other forms of the Applicant's invention may be had, all coming within the spirit of the invention and the scope of the appended claims.

Having thus described my invention what I claim is:

1. A fuel vaporizing device for use with internal combustion engines including a carburetor, an air filter, and a source of fuel, the improvement comprising:
   a vaporizer including a vaporized fuel chamber;
   a first fuel conduit having first and second ends, the first end connected to the source of fuel and the second end connected to the carburetor;
   a second fuel conduit having first and second ends, the first end connected to the source of fuel and the second end connected to the vaporizer;
   means for maintaining a predetermined fuel level in the vaporizer;
   means for vaporizing the fuel in the vaporizer, the vaporizing means including means, immersed within the fuel in the vaporizer, for vaporizing the fuel, and a baffle positioned above the fuel in the vaporizer and dividing the vaporizer into a fuel chamber and a vapor chamber; and an air pump including an air inlet and an air discharge, the air discharge being interconnected to the vapor chamber of the vaporizer; and wherein the air pump passes air through the vapor chamber in which the air collects vapor and the air and vapor mixture is passed to the carburetor and mixed with air passing therethrough.

2. The device as defined in claim 1 further comprising an engine valve cover in communication with an engine crankcase with a breather conduit extending between an air inlet side of the air cleaner and the valve cover, a manifold vacuum actuated valve disposed to admit unfiltered air to the breather conduit when the engine is operating, the air pump air inlet being disposed in communication with the valve cover, and wherein, when the engine is operating, air is drawn into the valve cover where the air ventilates the crank case, then the air is passed by the air pump to the vapor chamber to pick up vapor with the air and vapor mixture being passed to the carburetor and mixed with air passing thereby.

3. The device as defined in claim 1 wherein the means for maintaining a predetermined fuel level in the vaporizer comprises a float actuated valve to selectively control fuel flow into the vaporizer in response to the fuel level therein.

4. The device as defined in claim 1 wherein the means for maintaining a predetermined fuel level in the vaporizer comprises:

an orifice in the first conduit;

a drain outlet in the vaporizer positioned at the desired fuel level; and a drain conduit extending between the drain outlet and the fuel tank.

5. The device as defined in claim 5 wherein the heating means comprises at least one of a conduit having engine oil, engine coolant, and engine exhaust passing therethrough and an electrical conductor having electrical current flowing therethrough.

6. A fuel vaporizing device for use with internal combustion engines including a carburetor, an air filter, and a source of fuel, the improvement comprising:

a vaporizer including a vaporized fuel chamber;

a first fuel conduit having first and second ends, the first end connected to a source of fuel and the second end connected to the carburetor;

a second fuel conduit having first and second ends, the first end connected to the source of fuel and the second end connected to the vaporizer;

means for maintaining a predetermined fuel level in the vaporizer;

means for vaporizing the fuel; the vaporizing means including:

the vaporizer divided by a wall into a fuel chamber for holding fuel and a vapor chamber;

a wick including a first end, a second end, and a central portion joining the first end and the second end;

the first end of the wick being immersed in the fuel in the fuel chamber and extending through the wall into the vapor chamber;

the central portion of the wick forming a loop in the vapor chamber;

the second end of the wick extending through the wall and being immersed in the fuel in the fuel chamber;

a heating means immersed in the fuel in the fuel chamber; and wherein the first and second ends of the wick draw fuel into the vaporizing chamber by capillary action wherein the fuel is vaporized;

an air pump including an air inlet and an air discharge, the air discharge being interconnected to the vapor chamber of the vaporizer; and wherein the air pump passes air through the vapor chamber in which the air collects vapor and the air and vapor mixture is passed to the carburetor and mixed with air passing therethrough.

7. The device as defined in claim 6 wherein the heating means comprises at least one of a conduit having engine oil, engine exhaust and engine coolant passing therethrough and an electrical conductor having electrical current flowing therethrough.

* * * * *